US008522547B2

(12) United States Patent
Sumser et al.

(10) Patent No.: US 8,522,547 B2
(45) Date of Patent: Sep. 3, 2013

(54) EXHAUST GAS TURBOCHARGER FOR AN INTERNAL COMBUSTION ENGINE OF A MOTOR VEHICLE

(75) Inventors: Siegfried Sumser, Stuttgart (DE); Stephan Krätschmer, Schwäbisch Gmünd (DE); Markus Müller, Waiblingen (DE)

(73) Assignee: Daimler AG, Stuttgart (DE)

( * ) Notice: Subject to any disclaimer, the term of this patent is extended or adjusted under 35 U.S.C. 154(b) by 461 days.

(21) Appl. No.: 12/927,866

(22) Filed: Nov. 27, 2010

(65) Prior Publication Data

US 2011/0088391 A1 Apr. 21, 2011

Related U.S. Application Data

(63) Continuation-in-part of application No. PCT/EP2009/005349, filed on Jul. 23, 2009.

(30) Foreign Application Priority Data

Aug. 21, 2008 (DE) .......................... 10 2008 039 086

(51) Int. Cl.
*F02D 23/00* (2006.01)
(52) U.S. Cl.
USPC ............... 60/597; 60/602; 60/605.2; 415/126
(58) Field of Classification Search
USPC ........... 60/597, 598, 602, 605.2; 123/568.17; 415/126
See application file for complete search history.

(56) References Cited

U.S. PATENT DOCUMENTS

| 3,614,259 A | * | 10/1971 | Neff ............................... 415/205 |
| 4,027,994 A | * | 6/1977 | MacInnes ........................ 415/1 |
| 4,111,598 A | * | 9/1978 | Kasuya .......................... 415/202 |
| 4,218,182 A | * | 8/1980 | Tsunoda et al. ............... 415/205 |
| 4,288,988 A | * | 9/1981 | Curtil ........................... 60/605.1 |

(Continued)

FOREIGN PATENT DOCUMENTS

| DE | 10 2004 034 070 | 2/2006 |
| DE | 10 2004 038 903 | 2/2006 |
| GB | 2 134 602 | 8/1984 |
| JP | 2008-506073 | 2/2006 |
| WO | 2004/031552 A3 | 4/2004 |
| WO | WO 2004/031552 | 4/2004 |
| WO | 2006/018189 | 2/2006 |

OTHER PUBLICATIONS

Patent Abstracts of Japan, Turbine Scroll for a turbo-supercharger, publ. No. 60019920 A,—Feb. 1, 1985.

*Primary Examiner* — Mary A Davis
*Assistant Examiner* — Jason T Newton
(74) *Attorney, Agent, or Firm* — Klaus J. Bach

(57) ABSTRACT

In an exhaust gas turbocharger for an internal combustion engine of a motor vehicle with a turbine comprising a turbine housing with at least a first and a second spiral channel, each being coupled to an exhaust gas line of an exhaust gas tract of the internal combustion engine for conducting exhaust gas to a turbine wheel arranged within the turbine housing and driving a compressor wheel of a compressor of the exhaust gas turbocharger, an area ratio $Q_g$ of the turbine corresponds to the formula $Q_g=(A_\lambda+A_{AGR})/A_R>0.40$, wherein $A_\lambda$ refers to a narrowest flow cross-section of the first spiral channel, $A_{AGR}$ to a narrowest flow cross-section of the second spiral channel (52b) and $A_R$ to a wheel exit flow cross-section of the turbine exhaust channel. The invention further relates to a motor vehicle with an internal combustion engine and such an exhaust gas turbocharger.

11 Claims, 3 Drawing Sheets

(56) References Cited

U.S. PATENT DOCUMENTS

| | | | |
|---|---|---|---|
| 5,092,126 A * | 3/1992 | Yano | 60/602 |
| 6,220,031 B1 * | 4/2001 | Daudel et al. | 60/602 |
| 6,256,991 B1 * | 7/2001 | Schmidt et al. | 60/602 |
| 6,672,061 B2 * | 1/2004 | Schmid et al. | 60/605.2 |
| 7,014,418 B1 * | 3/2006 | Arnold et al. | 415/100 |
| 7,269,950 B2 * | 9/2007 | Pedersen et al. | 60/602 |
| 7,351,042 B2 * | 4/2008 | Jinnai et al. | 417/407 |

\* cited by examiner though sufficient flow cross-sectional areas, still in connection with the comparatively large wheel exit flow cross section $A_R$ necessary due to the required charge pressure. It is thereby advantageous, if the area ratio is in the range of at least 0.5 to 0.95, wherein the maximum reaction degree can still be realized at approximately 0.95. By restricting the area ratio to the named ranges, the reaction degree is in a range in which particularly the air delivery at low rotations of the internal combustion engine, as for example between 1000 and 2000 rotations per minute, is especially efficient.

EXHAUST GAS TURBOCHARGER FOR AN INTERNAL COMBUSTION ENGINE OF A MOTOR VEHICLE

This is a Continuation-In-Part Application of pending international patent application PCT/EP2009/005349 filed Jul. 23, 2009 and claiming the priority of German patent application 10 2008 039 086.0 filed Aug. 21, 2008.

BACKGROUND OF THE INVENTION

The invention relates to an exhaust gas turbocharger for an internal combustion engine with a turbine housing having first and second spiral inlet channels for directing exhaust gas onto a turbine which is disposed in the turbine housing. The invention further relates to a motor vehicle with an internal combustion engine and such an exhaust gas turbocharger.

Due to the continuous tightening of the emission limit values, for example the $NO_x$ and soot emission values of motor vehicles, the demands of exhaust gas turbochargers or charged internal combustion engines also increase. Thus, there are increasing demands regarding the charge pressure provision with high exhaust gas recirculation rates (AGR rate) over medium to high load demand ranges of the internal combustion engine whereby the turbines of exhaust gas turbochargers are increasingly scaled down geometrically. In other words, the required high turbine performances of exhaust gas turbochargers are realized by an increase of the retention ability and a corresponding reduction of the intake ability of the turbines in cooperation with the respective internal combustion engine.

The performance of exhaust gas turbochargers is further affected by exhaust gas treatment systems arranged in the exhaust gas tract downstream of the turbine as for example soot filters, catalysts or SCR systems. These exhaust gas treatment systems lead to a pressure increase at an exhaust gas outlet of the exhaust gas turbocharger. This again causes a reduction of a turbine pressure gradient defining the performance of the exhaust gas turbocharger, wherein the turbine pressure gradient can be determined as the quotient of a gas pressure before the turbine wheel or an exhaust gas inlet of the turbine wheel housing and a gas pressure behind the turbine wheel or an exhaust gas outlet of the turbine housing. Also, due to this reason, the turbine size again has to be designed for lower values and thus lower efficiencies in order to be able to satisfy the performance demand of the compressor of the exhaust gas turbocharger.

A certain improvement is provided by exhaust gas turbochargers known in the state of the art, whose turbine housings comprise two spiral channels through which exhaust gas can be separately admitted to the turbine and which are respectively coupled to different exhaust gas lines of an exhaust gas tract of the internal combustion engine via annular inlet vane structures. The exhaust gas lines themselves are associated with different cylinders or cylinder groups of the internal combustion engine. One of the spiral channels thereby usually serves as a so-called lambda spiral which provides for the necessary air-fuel ratio via its exhaust gas retention ability. The other spiral channel serves in contrast as a so-called exhaust gas recirculation spiral (AGR spiral) and is responsible for the exhaust gas recirculation ability of the exhaust gas turbocharger.

With the design limit conditions of exhaust gas turbochargers, which are usually defined by a nominal operating point, a charge change aspect and a fuel consumption aspect of the internal combustion engine, particularly the lower load and speed range of internal combustion engines can often not be attended to in an optimum manner even with exhaust gas turbochargers with two spiral inlet channels. The flow cross-sectional areas of the spiral channels are in principle chosen to be as small as possible for this purpose, in order to be able to generate the necessary exhaust gas flow speeds.

It is a disadvantage of the known exhaust gas turbochargers that they have comparatively low efficiencies, so that also the requirement of an internal combustion engine provided with the exhaust gas turbocharger relatively high. This necessitates additional measures for an efficiency increase, whereby the manufacturing costs however also increase considerably.

It is thus the object of the present invention to which provides for an efficiency improvement with manufacturing costs as low as possible even with the highly transient requirements of internal combustion engine or motor vehicles.

SUMMARY OF THE INVENTION

In an exhaust gas turbocharger for an internal combustion engine of a motor vehicle with a turbine comprising a turbine housing with at least a first and a second spiral channel, each being coupled to an exhaust gas line of an exhaust gas tract of the internal combustion engine for conducting exhaust gas to a turbine wheel arranged within the turbine housing and driving a compressor wheel of a compressor of the exhaust gas turbocharger, an area ratio $Q_g$ of the turbine corresponds to the formula $Q_g=(A_\lambda+A_{AGR})/A_R>0.40$, wherein $A_\lambda$ refers to a narrowest flow cross-section of the first spiral channel, $A_{AGR}$ to a narrowest flow cross-section of the second spiral channel (52b) and $A_R$ to a wheel exit flow cross-section of the turbine exhaust channel. The invention further relates to a motor vehicle with a combustion engine and such an exhaust gas turbocharger.

In other words, the spiral channels of the turbine of the exhaust gas turbocharger according to the invention have a significantly increased narrowest flow cross-sectional area sum $A_\lambda+A_{AGR}$ compared to the state of the art in relation to the narrowest cross-sectional area downstream of the spiral channels, namely the wheel exit flow cross-sectional area $A_R$. The exhaust gas turbochargers or turbines known from the state of the art are designed in such a manner that the major exergy amount of the total pressure gradient of the turbine is converted to speed in front of the turbine wheel in the spiral channels and not in the turbine wheel channels. In the turbines known from the state of the art the reaction degree of the turbine, which is defined by the quotient of the speed conversion in the turbine wheel channel and the speed conversion in the spiral channels, is thus below the value 0.4. Compared to this, a deviating gradient division of the total gradient of the turbine can be achieved with the exhaust gas turbocharger according to the invention during operation, wherein reaction degrees are achieved that are above 0.5. As the sum of the flow cross-sectional areas $A_\lambda$, $A_{AGR}$ is larger in comparison with the state of the art, additionally only low demands are made with regard to the manufacturing limits, so that cost-efficient sand casting methods or the like can be used for the manufacture of the turbine housing without any problems.

In an advantageous embodiment of the invention the area ratio $Q_g$ of the turbine is at least 0.45 and preferably at least 0.5. Increased efficiencies are achieved hereby for larger mass exhaust gas flows, whereby the total behavior of the exhaust gas turbocharger becomes very advantageous with regard to the air delivery in large operating ranges. The multi-flow turbine thereby has a reaction degree, which is above the value of 0.45 or 0.5 of the design operating point which is unusual.

Further advantages are obtained with an area ratio $Q_\lambda$ between the narrowest flow cross-sectional area $A_\lambda$ of the first spiral channel and the wheel exit cross-sectional area $A_R$ of the turbine wheel channel which is at least 0.35. Particularly when the first spiral channel is arranged as a so-called lambda spiral in the exhaust gas tract, a correspondingly improved efficiency can be achieved, as no exhaust gas recirculation volume losses occur.

In a further advantageous embodiment of the invention, the area ratio $Q_\lambda$ between the narrowest flow cross-sectional area $A_\lambda$ of the first spiral channel and the exit cross-sectional area $A_R$ of the turbine wheel channel is at least 0.4, preferably at least 0.5 and particularly at least 0.6. In this manner, the first spiral channel can be operated with correspondingly high reaction degrees according to an optimal reaction turbine, whereby particularly high turbine efficiencies can be achieved and the total behavior of the exhaust gas turbocharger is particularly advantageous in wide operating ranges with regard to its air delivery.

In a further arrangement of the invention, it is provided that an area ratio $Q_{AGR}$ of the second spiral channel and the wheel exit cross-sectional area $A_R$ of the turbine wheel channel is at most 0.3. Particularly when the second spiral channel is in the form of a so-called AGR spiral, the second spiral channel can operate with reaction degrees below 0.3 according to an impulse turbine. The respective area ratio $Q_{AGR}$ is preferably chosen in dependence on the AGR, (Exhaust Gas Recirculation) requirement of the internal combustion engine.

Further advantages result in that the area ratio $Q_{AGR}$ of the narrowest flow cross-sectional area $A_{AGR}$ of the second spiral channel and the wheel exit cross-sectional area $A_R$ of the turbine wheel channel is at most 0.28, preferably at most 0.25 and particularly not more than 0.1. Particularly strict emission limit determinations can hereby also be accounted for and the emission behavior of the associated internal combustion engine can be improved correspondingly.

In a further advantageous embodiment of the invention, the narrowest flow cross-sectional area $A_\lambda$ of the first spiral channel and/or the narrowest flow cross-sectional area $A_{AGR}$ of the second spiral channel are provided in the exit area of the first and second spiral channels to the turbine wheel channels. The narrowest flow cross-sectional area $A_\lambda$ or $A_{AGR}$ is advantageously in the form of an annular nozzle for generating high exhaust gas flow speeds.

In a further advantageous arrangement of the invention, the first and/or the second spiral channel comprises at least two spiral segment channels which are separated in a fluidic manner, and which can be coupled to different exhaust gas lines of the internal combustion engine. An exhaust gas turbocharger with a turbine formed with at least three flows is created in this manner, wherein the spiral segment channels enable an impact charging operating with a more effective use of the expansion energy of individual cylinders or cylinder groups. Lower load and speed regions of the internal combustion engine can hereby also be provided in an optimal manner, so that a considerable efficiency improvement is ensured over a wider operating range of the internal combustion engine. The flow cross-sectional area $A_\lambda$ designates in this case the sum of the flow cross-sectional areas of the at least two spiral segment channels. The number of the spiral segment channels can thereby be adapted to the number of the cylinders or cylinder groups. It can also be provided that both spiral channels have two or more spiral segment channels. It can alternatively or additionally be provided that the turbine of the exhaust gas turbocharger comprises three or more spiral channels.

In order to be able to better adapt the operation of the turbine to the operation of the internal combustion engine, it has been shown to be advantageous in a further arrangement that the turbine comprises an inlet vane structure. A flow control depending on the geometric arrangement of the vane structure is facilitated hereby. The vane structure is adjustable whereby the inflow of the exhaust gas can advantageously be controlled depending on a load or flow rate. The vane structure can for example be mounted in the turbine housing so as to be translationally movable or the vanes are pivotally adjustable.

Particular advantages are obtained if the narrowest flow cross-sectional area $A_\lambda$ of the first spiral channel and/or the narrowest flow cross-sectional area $A_{AGR}$ of the second spiral channel are formed by the vane structure and/or can be adjusted by the vane structure. A particularly high geometric variability of the turbine and a corresponding adjustability of the flow guidance is given in this manner. A further increase of the efficiency can be achieved hereby, as the corresponding spiral channel upstream of the vane structure can be provided with an enlarged cross-sectional area.

A further aspect of the invention relates to a motor vehicle with an internal combustion engine which comprises at least two cylinders or cylinder groups, which are connected to at least two exhaust gas lines of an exhaust gas tract, and with an exhaust gas turbocharger, which comprises a compressor arranged in an intake tract of the internal combustion engine and a turbine arranged in the exhaust gas tract of the internal combustion engine. The turbine comprises on its part a turbine housing with at least a first spiral channel coupled to a first exhaust gas line, a second spiral channel coupled to a second exhaust gas line, and a turbine wheel arranged within a turbine wheel channel of the turbine housing. The turbine wheel is thereby driven by the exhaust gas of the internal combustion engine which is guided through the at least two spiral channels for driving the compressor wheel of the compressor, the compressor wheel being rigidly coupled to the turbine wheel by a common shaft. According to the invention, an efficiency improvement is thereby obtained with highly transient requirements of the internal combustion engine or of the motor vehicle with relatively low manufacturing costs in that the exhaust gas is formed according to one of the preceding embodiments. The advantages resulting from this can be taken from the corresponding descriptions.

The invention will become more readily apparent from the following description of an exemplary embodiment with reference to the accompanying drawings.

DESCRIPTION OF AN EXEMPLARY EMBODIMENT

Figure 1:
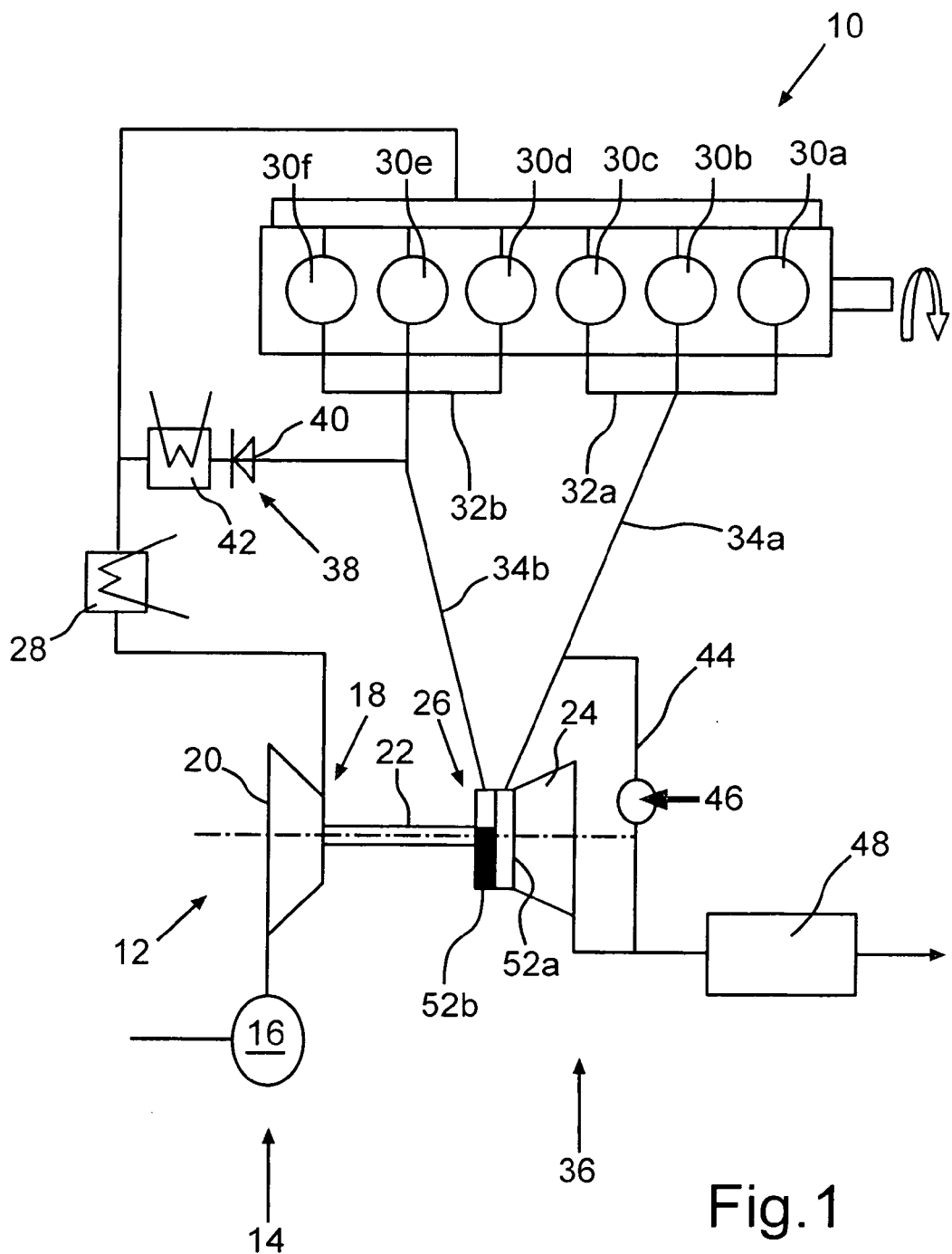
FIG. 1 shows schematically an internal combustion engine of a motor vehicle which is provided with an exhaust gas turbocharger according to one embodiment of the invention.

FIG. 1 shows schematically an internal combustion engine 10 of a motor vehicle (not shown), which is provided with an exhaust gas turbocharger 12. The internal combustion engine 10 comprises an intake tract 14 with an air filter 16. A compressor 18 of the exhaust gas 12 is arranged downstream of the air filter 16. The compressor 18 has a compressor wheel 20, which is connected rigidly to a turbine wheel 24 by means of a common shaft 22 of a turbine 26 of the exhaust gas turbocharger 12. The intake tract 14 includes a charge-air cooler 28 downstream of the compressor wheel 20. The internal combustion engine 10 is a Diesel engine in the present embodiment and comprises six cylinders 30a-f which are divided into two cylinder groups 32a, 32b, so that the individual cylinders 30a-f do not influence each other during a charge change. The cylinder groups are connected to the turbine 26 of the exhaust gas turbocharger via two separate exhaust gas lines 34a, 34b of an exhaust gas tract 36 of the internal combustion engine 10. An exhaust gas recirculation device 38 with a valve 40 and an exhaust gas cooler 42 is arranged between the cylinders 30d-f and the intake tract 14 so that exhaust gas can be directed from the exhaust gas line 34b into the intake tract 14. Also, a bypass line 44 with a relief valve 46 is arranged upstream of the turbine, whereby exhaust gas can bypass the turbine 26 when necessary. The bypass line 44 and the relief valve 46 are integrated into a turbine housing 50 of the turbine 26. An exhaust gas treatment system 48 is finally arranged in the exhaust gas tract 36 downstream of the turbine 26, by means of which treatment system an exhaust gas treatment is carried out.

Figure 2:
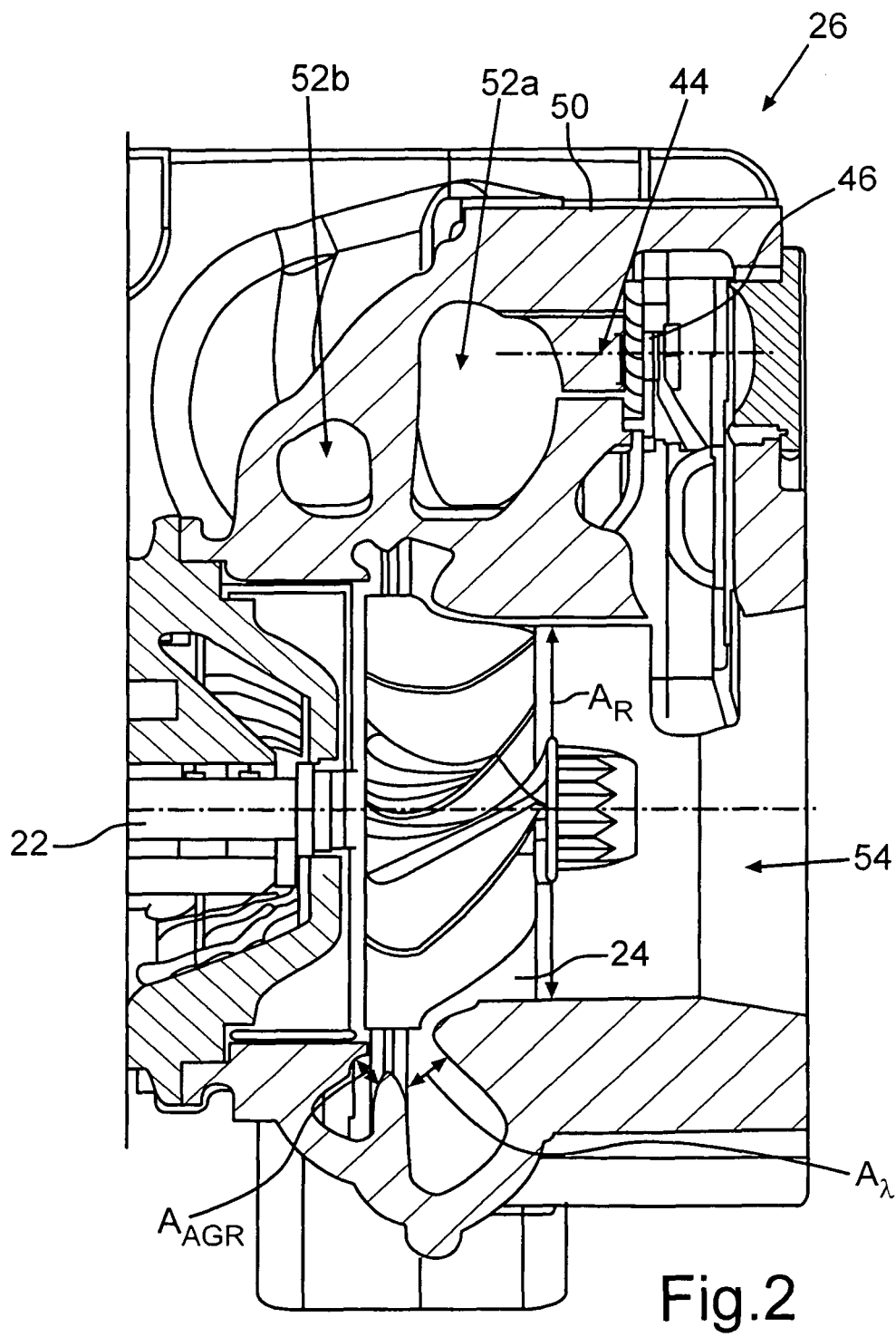
FIG. 2 shows an axial cross-sectional view of a turbine of the exhaust gas turbocharger shown in FIG. 1.

The turbine 26 of the exhaust gas turbocharger 12 will be explained in the following in connection with FIG. 2, which shows an axial cross-sectional view of the turbine 26. The turbine housing 50 of the turbine 26 which is formed as a cost-efficient sand casting part, comprises a first spiral channel 52a coupled to the first exhaust gas line 34a, a second spiral channel 52b coupled to the second exhaust gas line 34b and the turbine wheel 24 arranged within a turbine wheel channel 54. The spiral channel 52a is arranged at the exit side and formed as a full spiral with a looping angle of approximately 360°, whereas the spiral channel 52b is arranged on the bearing side and is formed as a partial spiral with a looping angle of less than 360°. In principle, both spiral channels 52a, 52b can however be formed as a full and/or partial spiral. It can also be provided that at least one spiral channel 52a or 52b is formed as a segment spiral with two or more segment channels distributed over the circumference of the turbine housing 50, which are coupled to a correspondingly adapted number of exhaust gas lines 34. The spiral channel 52a is thereby formed as a so-called lambda spiral which affects the necessary air-fuel ratio via its exhaust gas retention ability. The other spiral channel 52b serves, in contrast, as a so-called exhaust gas recirculation spiral (AGR spiral) and is responsible for the exhaust gas recirculation capability of the exhaust gas turbocharger 12 or of the turbine 26.

In order to provide for an efficiency improvement with manufacturing costs as low as possible even with the highly transient requirements of the internal combustion engine 10, an area ratio $Q_g$ of the turbine corresponds to the formula $$Q_g = (A_\lambda + A_{AGR})/A_R \geq 0.50$$

wherein $A_\lambda$ refers to a narrowest flow cross-section of the first spiral channel 52a, $A_{AGR}$ to a narrowest flow cross-section area of the second spiral channel 52b, and $A_R$ to an outlet cross-section of the turbine wheel channel 54 in the exit region of the turbine wheel 24. Additionally, an area ratio $Q_\lambda$ between the narrowest flow cross-section $A_\lambda$ of the first spiral channel 52a and the wheel exit cross-section area $A_R$ of the turbine wheel channel 54 is at least $Q_4 = A_{80}/A_R = 0.4$ and an area ratio $Q_{AGR}$ between the narrowest flow cross-section $A_{AGR}$ of the second spiral channel 52b and the wheel exit cross-section $A_R$ of the turbine wheel channel 54 is at most $Q_{AGR} = A_{AGR}/A_R = 0.25$. It can alternatively be provided that the area ratio $Q_{AGR}$ is chosen in dependence on the AGR requirement of the internal combustion engine 10 and thus can also be chosen to be lower than 0.25, possibly lower than 0.1. It can alternatively be provided that the flow cross-sectional areas $A_\lambda$, $A_{AGR}$ are formed by a vane structure (not shown), whereby a further increase of the turbine efficiency can be achieved, as the spiral channels 52a, 52b can in this case be formed with enlarged cross-sectional areas upstream the corresponding vane structure.

Figure 3:
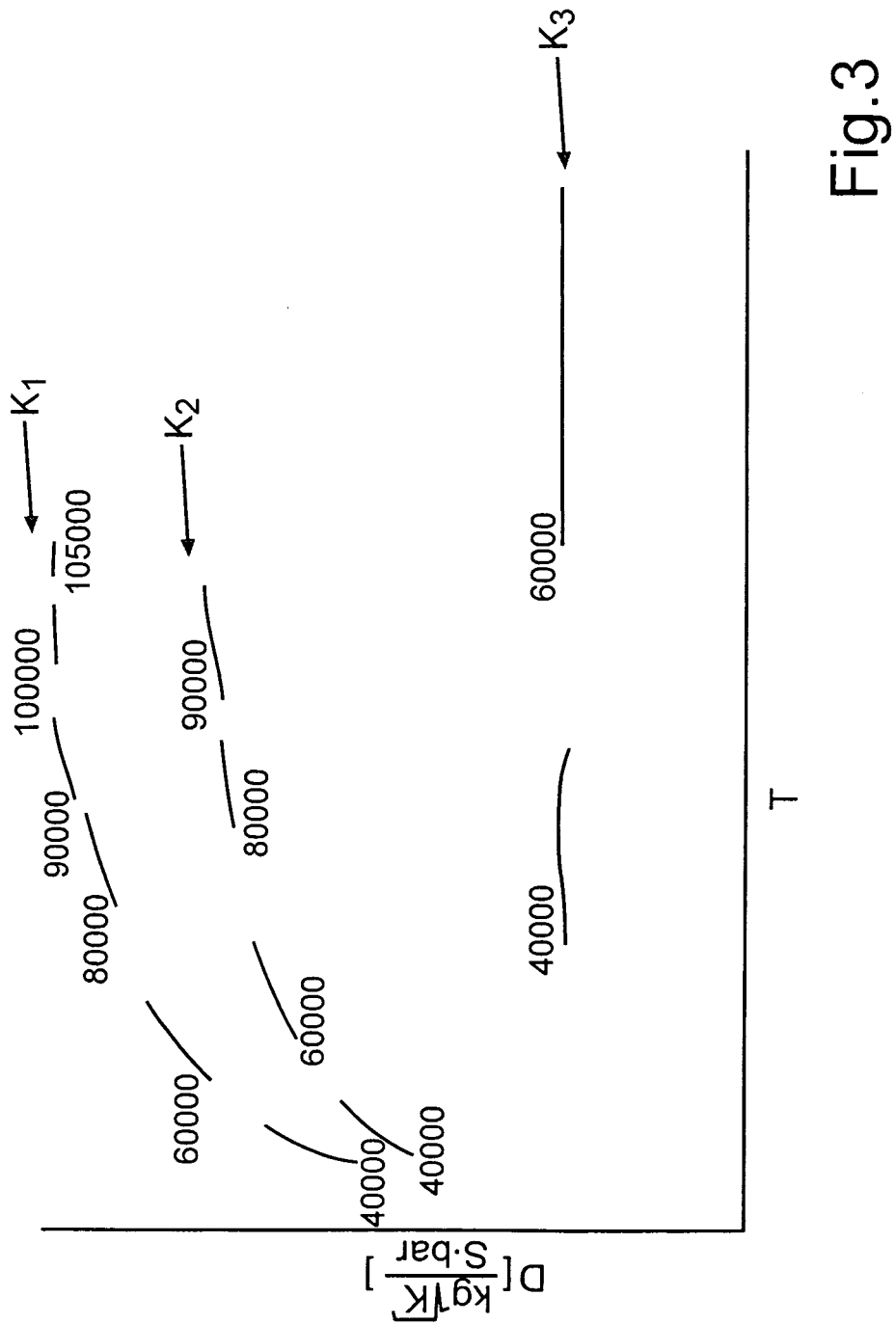
FIG. 3 shows a turbine performance graph of the exhaust gas turbocharger according to the invention.

FIG. 3 shows a performance graph of the turbine 26 of the exhaust gas turbocharger 12. A flow rate parameter D[kg*√K/s*bar] is thereby provided on the ordinate over a turbine pressure ratio $T = p_{3t}/p_4$ of the pressure $p_{3t}$ at the flange entry of the spiral channels 52a, 52b and the pressure $p_4$ at the turbine wheel 24 outlet. The flow rate characteristic lines $K_{1-3}$ are thereby depicted for different pressures. The flow rate line $K_1$ shows the flow rate behavior with opened spiral channel 52a, 52b. The flow rate $K_2$ shows the flow rate behavior with opened spiral channel 52a and closed spiral channel 52b, the flow rate line $K_3$ finally shows the flow rate behavior with an opened spiral channel 52b and closed spiral channel 52a.

What is claimed is:

1. An exhaust gas turbocharger (12) for an internal combustion engine (10) of a motor vehicle with a turbocharger including a turbine (26) with a turbine housing (50) having at least a first and a second spiral channel (52a, 52b), each of said channels being connected to an exhaust gas line (34a, 34b) of an exhaust gas tract (36) of the internal combustion engine (10) for conducting exhaust gas to the turbine housing (50), including a turbine wheel channel (54) with a turbine wheel (24) arranged therein, said turbine wheel (24) being operable by exhaust gas which is supplied by the internal combustion engine (10) and guided through the spiral channels (52a, 52b) onto the turbine wheel (24) for driving a compressor wheel (20) of a compressor (18) of the exhaust gas turbocharger (12), which is rigidly coupled to the turbine wheel by way of a common shaft (22), said turbine (26) housing having an area ratio $Q_g$ which has a value larger than 0.4, the area ratio $Q_g$ of the turbine being defined by the formula $$Q_g = (A_\lambda + A_{AGR})/A_R$$

wherein:
   $A_\lambda$ refers to a narrowest flow cross-sectional area of the first spiral channel (52a);
   $A_{AGR}$ to a narrowest flow cross-sectional area of the second spiral channel (52a); and
   $A_R$ to a wheel exit cross-sectional area of the turbine wheel channel (54).

2. The exhaust gas turbocharger (12) according to claim 1, wherein the area ratio $Q_g$ of the turbine is at least 0.45 and preferably at least 0.5.

3. The exhaust gas turbocharger according to claim 1, wherein an area ratio $Q_\lambda$ between the narrowest flow cross-section $A_\lambda$ of the first spiral channel (52a) and the exit cross-section $A_R$ of the turbine wheel channel (54) is at least 0.35.

4. The exhaust gas turbocharger according to claim 3, wherein the area ratio $Q_\lambda$ of the narrowest flow cross-section $A_\lambda$ of the first spiral channel (52a) and exit cross-section $A_R$ of the turbine wheel channel (54) is at least 0.4, preferably at least 0.5 and in particular 0.6.

5. The exhaust gas turbocharger according to claim 1, wherein an area ratio $Q_{AGR}$ between the narrowest flow cross-section $A_{AGR}$ of the second spiral channel (52b) and the wheel exit cross-section $A_R$ of the turbine wheel channel (54) is at most 0.3.

6. The exhaust gas turbocharger according to claim 5, wherein the area ratio $Q_{AGR}$ between the narrowest flow cross-section $A_{AGR}$ of the second spiral channel (52b) and the wheel exit cross-section $A_R$ of the turbine wheel channel (54) is at most 0.28, preferably at most 0.25 and in particular not more than 0.1.

7. The exhaust gas turbocharger according to claim 1, wherein the narrowest flow cross-section $A_\lambda$ of at least one of the first spiral channel (52a) and the narrowest flow cross-section $A_{AGR}$ of the second spiral channel (52b) is provided in the opening region of the first or, respectively, the second spiral channel (52a, 52b) in the turbine wheel channel (54).

8. The exhaust gas turbocharger (12) according to claim 1, wherein at least one of the first and the second channel (52a, 52b) comprises at least two spiral segment channels which are separated in a fluidic manner and which are coupled to different exhaust gas lines (34a, 34b) of the internal combustion engine (10).

9. The exhaust gas turbocharger (12) according to claim 1, wherein the turbine (26) comprises a guide vane structure arranged in at least one of the spiral channel inlet to the turbine wheel.

10. The exhaust gas turbocharger according to claim 9, wherein at least one of the narrowest flow cross-section $A_\lambda$ of the first spiral channel (52a) and the narrowest flow cross-sectional area $A_{AGR}$ of the second spiral channel (52b) is formed by the guide vane structure which is adjustable.

11. A motor vehicle with an internal combustion engine (10) comprising at least two groups of cylinders (30a-f), which are connected to at least two exhaust gas lines (34a, 34b) of an exhaust gas tract (36) and with an exhaust gas turbocharger (12) comprising a compressor (18) arranged in an intake tract (14) of the internal combustion engine (10) and a turbine (26) arranged in the exhaust gas tract (36) of the internal combustion engine (10), the turbine (26) comprising a turbine housing (50) with at least a first spiral channel (52a) coupled to a first exhaust gas line (34a), a second spiral channel (52b) coupled to a second exhaust gas line (34b), and a turbine wheel (24) arranged within a turbine wheel channel (54) of the turbine housing (50) for driving the turbine wheel (24) by means of the internal combustion engine (10) exhaust gas conducted through the at least first and second spiral channels (52a, 52b) for driving a compressor wheel (20) of the compressor (18), the compressor wheel being rigidly coupled to the turbine wheel by a common shaft (22), said turbine (26) housing having an area ratio $Q_g$ which has a value larger than 0.4, the area ratio $Q_g$ of the turbine being defined by the formula $$Q_g = (A_\lambda + A_{AGR})/A_{R1}$$

wherein:
$A_\lambda$ refers to a narrowest flow cross-sectional area of the first spiral channel (52a);
$A_{AGR}$ to a narrowest flow cross-sectional area of the second spiral channel (52a); and
$A_R$ to a wheel exit cross-sectional area of the turbine wheel channel (54).

\* \* \* \* \*